UNITED STATES PATENT OFFICE.

TOMENOSUKE MUTO, OF KOBE, JAPAN, ASSIGNOR TO KANEGAFUCHI BOSEKI KABUSHIKI KWAISHA, OF TOKYO-FU, JAPAN.

PROCESS FOR TREATING SILK FIBERS.

1,296,601.

Specification of Letters Patent. Patented Mar. 4, 1919.

No Drawing. Application filed April 25, 1917. Serial No. 164,344.

*To all whom it may concern:*

Be it known that I, TOMENOSUKE MUTO, a subject of the Empire of Japan, residing at 279 Minatomachi 1-chome, Kobe, Japan, have invented a certain new and useful Process for Treating Silk Fibers, of which the following is a specification.

My invention relates to a treatment of silk fibers, wherein the fibers of silk are treated by means of the proteolytic enzym contained in the bodies of silkworms and several other cocoon-forming insects at every stage of their growth, as well as in their secretions and discharges, and has for its object to dissolve the sericin and loosen the fibers of silk within a short time at a comparatively low temperature, without injuring the silk.

The invention is based upon the fact that the bodies, secretions and discharges, of silkworms and other cocoon-forming insects at every stage of their growth, contain a proteolytic enzym which is capable of dissolving sericin and loosening the silk fibers at low temperatures without injuring them.

The silkworm products containing the enzym, such as the bodies of silkworms, silkworm pupæ, silkworm moths, their cast-off skins, secretions and discharges, or similar products from various other kinds of cocoon-forming insects, notably chestnut worms, pine worms, etc., are hereinafter referred to generically as "cocoon-forming insect material".

In the present invention, the fibers of silk to be treated are put into the juice extracted from such material as above mentioned and are heated therein to a temperature of about 40° C., whereby the sericin is gradually dissolved, due to the dissolving action of the enzym, and usually in forty minutes to an hour, the fibers of silk are fully loosened.

With some particular varieties of silk fibers, or with special silk products, another silk-scouring medium may be added such as soap, carbonate of soda or the like, such material being used previous to, or after, or simultaneously with, the enzym bath treatment.

In carrying out the process, say forty pounds of raw cocoons are immersed in, say, about 200 pounds of water at a temperature of about 40° C. for from five to fifteen minutes, and these are squeezed, and the extract thus obtained, after being filtered, is added to about four times its volume of water. If desired an antiseptic material, such as glycerin, may be added at the commencement of the operation. One hundred and twenty pounds of dried cocoons, or any kind of waste cocoons or waste silk are put in the said diluted liquid, and the whole then heated to a temperature of about 40° C. for forty-five minutes, during which time the fibers of silk become loosened.

I do not herein claim the enzym or the process of producing it, such matter being claimed in my copending application 164,343, filed concurrently herewith.

I claim:

1. The process of treating silk fibers, which comprises dissolving the sericin and loosening the fibers of silk by treating the silk material with a bath containing the active proteolytic enzym contained in cocoon-forming insect material.

2. The process of treating silk fibers, which comprises placing the fibers of silk to be treated into a liquid containing the enzym extracted from cocoon-forming insect material, and heated therein sufficiently long to loosen the silk fibers, at a temperature of about 40° C., whereby the decomposing action of the proteolytic enzym contained in the extract dissolves the sericin and the fibers of silk are thus loosened, substantially as set forth.

3. In the process of treating silk material, the step of subjecting the said material to the action of a liquid containing the proteolytic enzym extracted from cocoon-forming insect material and of another silk-scouring material.

4. The process of treating silk fibers which comprises subjecting the same successively, in any desired order, to the action of a liquor containing a proteolytic enzym of cocoon-forming insect material.

In testimony whereof I have affixed my signature in presence of two witnesses.

TOMENOSUKE MUTO.

Witnesses:
EISHIRO ABE,
Y. NAGAMATSU.